(12) United States Patent
Mittleman et al.

(10) Patent No.: US 9,497,527 B2
(45) Date of Patent: Nov. 15, 2016

(54) ACOUSTIC ASSEMBLY FOR AN ELECTRONIC DEVICE

(71) Applicant: Apple Inc., Cupertino, CA (US)

(72) Inventors: Adam Mittleman, Portola Valley, CA (US); Richard P. Howarth, San Francisco, CA (US); Chad Seguin, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 45 days.

(21) Appl. No.: 13/943,714

(22) Filed: Jul. 16, 2013

(65) Prior Publication Data

US 2014/0105440 A1    Apr. 17, 2014

Related U.S. Application Data

(60) Continuation of application No. 13/288,386, filed on Nov. 3, 2011, now Pat. No. 8,488,817, which is a division of application No. 12/119,995, filed on May 13, 2008, now Pat. No. 8,055,003.

(60) Provisional application No. 61/044,347, filed on Apr. 11, 2008, provisional application No. 61/041,522, (Continued)

(51) Int. Cl.
| | |
|---|---|
| *H04R 1/02* | (2006.01) |
| *H04R 1/04* | (2006.01) |
| *H04M 1/03* | (2006.01) |
| *H04M 1/18* | (2006.01) |

(52) U.S. Cl.
CPC .............. *H04R 1/02* (2013.01); *H04M 1/035* (2013.01); *H04R 1/023* (2013.01); *H04R 1/025* (2013.01); *H04R 1/04* (2013.01); *H04M 1/18* (2013.01); *H04R 1/026* (2013.01); *H04R 2499/11* (2013.01)

(58) Field of Classification Search
CPC ................... H04R 1/02; H04R 2499/11; H04R 1/406; H04R 2410/00; H04R 25/65; H04M 1/035; H04M 1/03
USPC ............... 381/355, 361, 365, 345, 386, 387; 455/575.1, 575.8
See application file for complete search history.

(56) References Cited

U.S. PATENT DOCUMENTS

| | | | |
|---|---|---|---|
| 5,442,713 A | 8/1995 | Patel et al. | |
| 5,828,012 A | 10/1998 | Repolle et al. | |
| 6,038,328 A | * 3/2000 | Hsu .............................. | 381/361 |

(Continued)

FOREIGN PATENT DOCUMENTS

WO        WO 0070843 A1 * 11/2000

*Primary Examiner* — Minh-Loan Tran
(74) *Attorney, Agent, or Firm* — Kilpatrick Townsend & Stockton LLP

(57) ABSTRACT

A portable electronic device may have acoustic ports such as microphone and speaker ports. Acoustic devices such as microphones and speakers may be associated with the acoustic ports. An acoustic port may have an opening between an interior and exterior of the portable electronic device. The opening may be covered by a metal mesh. An acoustic fabric may be interposed between the metal mesh and the opening. The opening may be formed from a hole in a glass member having outer and inner chamfers. A microphone boot may be provided that forms front and rear radial seals with a housing of the device and a microphone unit respectively. The microphone boot may also form multiple face seals with the microphone unit. A speaker for the speaker port may be enclosed in a sealed speaker enclosure. The speaker enclosure may have a pressure-equalizing vent slit covered with an acoustic mesh.

40 Claims, 15 Drawing Sheets

Related U.S. Application Data filed on Apr. 1, 2008, provisional application No. 61/041,532, filed on Apr. 1, 2008.

(56) References Cited

U.S. PATENT DOCUMENTS

| | | |
|---|---|---|
| 6,346,933 B1 | 2/2002 | Lin |
| 6,512,834 B1 | 1/2003 | Banter et al. |
| 6,744,900 B1 | 6/2004 | Turner et al. |
| 6,753,840 B2 | 6/2004 | Aoki |
| 6,785,395 B1 | 8/2004 | Arneson et al. |
| 6,793,346 B2 | 9/2004 | Nakano |
| 6,829,392 B2 | 12/2004 | Aoki |
| 6,829,664 B2 | 12/2004 | Nomizo et al. |
| 6,877,091 B2 | 4/2005 | Nomizo et al. |
| 6,880,938 B2 | 4/2005 | Nakano |
| 6,937,370 B1 | 8/2005 | Nitta et al. |
| 7,093,989 B2 | 8/2006 | Walmsley et al. |
| 7,110,536 B2 | 9/2006 | Hampton et al. |
| 7,466,837 B2 | 12/2008 | Nakamura |
| 7,953,243 B2 | 5/2011 | Liusvaara |
| 8,295,527 B2 * | 10/2012 | Chen .......................... 381/365 |
| 2001/0042117 A1 | 11/2001 | Yoshino et al. |
| 2002/0005858 A1 | 1/2002 | Aoki |
| 2002/0027603 A1 | 3/2002 | Kuwata et al. |
| 2002/0030833 A1 | 3/2002 | Kuwata et al. |
| 2002/0041263 A1 | 4/2002 | Aoki |
| 2002/0044293 A1 | 4/2002 | Fukasawa |
| 2002/0131078 A1 | 9/2002 | Tsukinokizawa |
| 2003/0126326 A1 | 7/2003 | Nomizo et al. |
| 2003/0164926 A1 | 9/2003 | Nakano et al. |
| 2003/0174289 A1 | 9/2003 | Nakano |
| 2004/0015597 A1 | 1/2004 | Thornton |
| 2004/0041775 A1 | 3/2004 | Irie |
| 2004/0060011 A1 | 3/2004 | Nitta et al. |
| 2004/0083302 A1 | 4/2004 | Thornton |
| 2004/0130502 A1 | 7/2004 | Sato et al. |
| 2004/0207869 A1 | 10/2004 | Endo |
| 2004/0227900 A1 | 11/2004 | Sato et al. |
| 2005/0015523 A1 | 1/2005 | Ishida et al. |
| 2005/0158065 A1 | 7/2005 | Matsuda |
| 2005/0174600 A1 | 8/2005 | Kitahara et al. |
| 2005/0190399 A1 | 9/2005 | Nakaoka et al. |
| 2005/0190942 A1 | 9/2005 | Moquin et al. |
| 2005/0243362 A1 | 11/2005 | Sakuda et al. |
| 2005/0278455 A1 | 12/2005 | Ichieda |
| 2006/0109502 A1 | 5/2006 | Nakajima et al. |
| 2006/0126102 A1 | 6/2006 | Sakuda |
| 2006/0129806 A1 | 6/2006 | Walmsley |
| 2006/0181685 A1 | 8/2006 | Hasegawa |
| 2006/0203133 A1 | 9/2006 | Fujiwara |
| 2006/0293091 A1 | 12/2006 | Hawker et al. |
| 2007/0116261 A1 | 5/2007 | Hawker et al. |
| 2008/0159558 A1 | 7/2008 | Lan et al. |

* cited by examiner

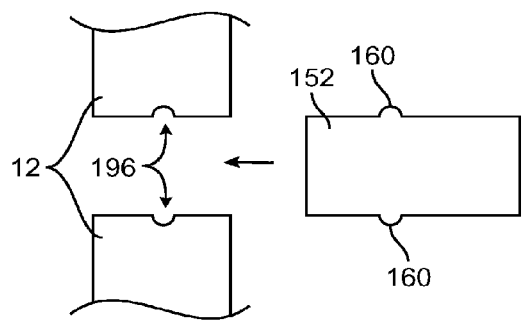 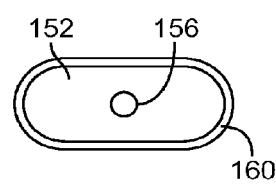
FIG. 16    FIG. 17
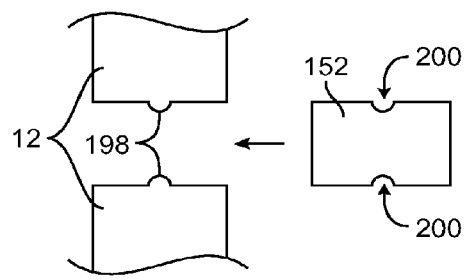
FIG. 18
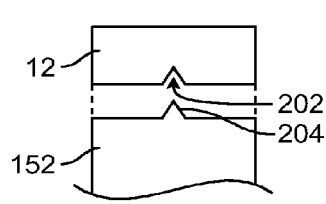 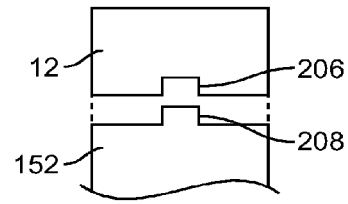
FIG. 19    FIG. 20

ACOUSTIC ASSEMBLY FOR AN ELECTRONIC DEVICE

This application is a continuation patent application of U.S. patent application Ser. No. 13/288,386, filed Nov. 3, 2011, now issued U.S. Pat. No. 8,488,817, which is a divisional patent application of U.S. patent application Ser. No. 12/119,995, filed May 13, 2008, now U.S. Pat. No. 8,055,003, which claims the benefit of Provisional Patent Application Nos. 61/044,347, filed Apr. 11, 2008, 61/041,522, filed Apr. 1, 2008, and 61/041,532, filed Apr. 1, 2008, all of which are hereby incorporated by reference herein in their entireties.

BACKGROUND

This invention relates generally to electronic devices, and more particularly, to acoustic systems for portable electronic devices such as handheld electronic devices.

Handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Portable electronic devices such as handheld electronic devices may include acoustic components such as microphones and speakers. For example, cellular telephones have microphones and receiver speakers. Many cellular telephones also have speakerphone speakers.

It can be difficult to satisfactorily integrate acoustic components into compact electrical devices. If care is not taken, acoustic performance will suffer and devices will not be sufficiently protected from environmental effects.

It would therefore be desirable to be able to provide electronic devices such as portable electronic devices with improved acoustic features.

SUMMARY

A portable electronic device such as a handheld electronic device is provided. The device may have acoustic ports. The acoustic ports may include a microphone port and one or more speaker ports. The speaker ports may be used as speakerphone ports or as ear speakers for a receiver when the device is used as a telephone.

The acoustic ports may be formed from openings in the housing for the portable electronic device. The openings may be covered with one or more layers of mesh. For example, the openings may be covered with a metal mesh. A layer of acoustic fabric may be interposed between the metal mesh and each opening. The metal mesh may have larger holes than the acoustic mesh. This may make the metal mesh more attractive in appearance than the acoustic mesh. Because the metal mesh is formed from metal wires rather than nonmetallic threads, the metal mesh may be more resistant to damage than nonmetallic fabrics. The finer holes available in the acoustic mesh may help to prevent intrusion of fine particles that pass through the metal mesh.

Layer of adhesive may be used to connect the metal and acoustic meshes to the device. If desired, an acoustic port such as a receiver speaker port may be formed from an opening in a cover glass that is otherwise used to cover a display unit. The opening in the cover glass may have outer and inner chamfers. The lower surface of the cover glass may be covered with ink. A layer of adhesive may be used to connect a speaker to the cover glass. The layer of adhesive may create an air gap between the metal mesh and the ink, so that the ink is not scratched by metal strands in the mesh.

A microphone port may have a microphone unit and an elastomeric microphone boot. The microphone boot may have an opening that permits sound to enter the microphone unit from outside of the portable electronic device. A front portion of the microphone boot may form environmental seals with the housing of the portable electronic device. Raised ribs or other engagement features may be used to form a radial seal between the boot and the housing. A rear portion of the microphone boot may form environmental seals with the microphone unit. A front surface of the microphone unit may form a front face seal with the microphone boot. A rear surface of the microphone unit may form a rear face seal with the microphone boot. A surface on the microphone unit that is located between the front and rear surfaces may form a radial seal with the microphone boot. Metal mesh and acoustic fabric may be used to cover the opening.

Further features of the invention, its nature and various advantages will be more apparent from the accompanying drawings and the following detailed description of the preferred embodiments.

BRIEF DESCRIPTION OF THE DRAWINGS

FIG. 16 is a cross-sectional view of a sealing arrangement with semicircular recesses that may be used in forming a seal for an acoustic component in accordance with an embodiment of the present invention.

FIG. 17 is an end view of an illustrative acoustic component having an acoustic opening in accordance with an embodiment of the present invention.

FIG. 18 is a cross-sectional view of a sealing arrangement with semicircular protrusions that may be used in forming a seal for an acoustic component in accordance with an embodiment of the present invention.

FIG. 19 is a cross-sectional view of a sealing arrangement with triangular recesses that may be used in forming a seal for an acoustic component in accordance with an embodiment of the present invention.

FIG. 20 is a cross-sectional view of a sealing arrangement with square recesses that may be used in forming a seal for an acoustic component in accordance with an embodiment of the present invention.

DETAILED DESCRIPTION

The present invention relates to acoustic systems for electronic devices.

The electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be wireless electronic devices.

The wireless electronic devices may be, for example, handheld wireless devices such as cellular telephones, media players with wireless communications capabilities, handheld computers (also sometimes called personal digital assistants), remote controllers, global positioning system (GPS) devices, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
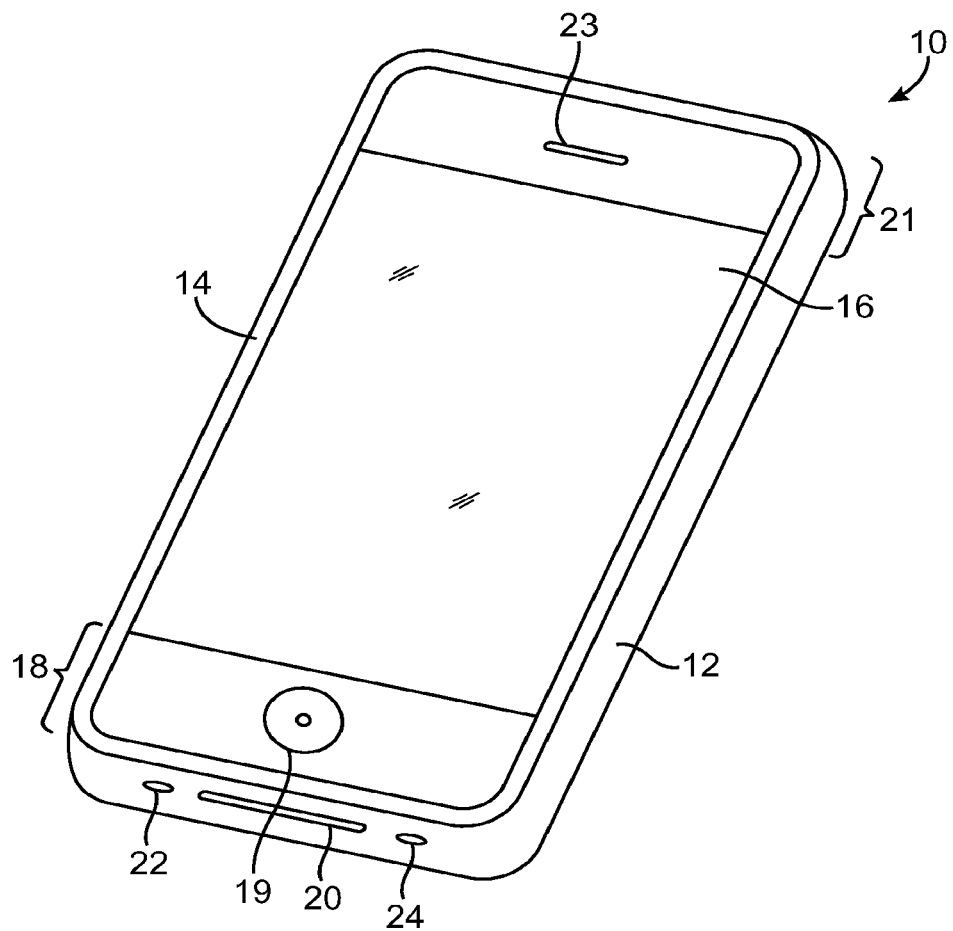
FIG. 1 is a perspective view of an illustrative portable electronic device in accordance with an embodiment of the present invention.

An illustrative portable electronic device in accordance with an embodiment of the present invention is shown in FIG. 1. Device 10 of FIG. 1 may be, for example, a handheld electronic device that supports 2G and/or 3G cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc.

Device 10 may have housing 12. Antennas for handling wireless communications may be housed within housing 12 (as an example).

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material, so that the operation of conductive antenna elements that are located in close proximity to housing 12 is not disrupted. Housing 12 or portions of housing 12 may also be formed from conductive materials such as metal. An advantage of forming housing 12 from a dielectric material such as plastic is that this may help to reduce the overall weight of device 10 and may avoid potential interference with wireless operations.

In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 10.

Housing 12 may have a bezel 14. The bezel 14 may be formed from a conductive material or other suitable material. Bezel 14 may serve to hold a display or other device with a planar surface in place on device 10 and may serve to form an esthetically pleasing trim around the edge of device 10. As shown in FIG. 1, for example, bezel 14 may be used to surround the top of display 16. Bezel 14 and/or other metal elements associated with device 10 may be used as part of the antennas in device 10. For example, bezel 14 may be shorted to printed circuit board conductors or other internal ground plane structures in device 10 to extend the ground plane element for device 10.

Display 16 may be a liquid crystal display (LCD), an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 22 and 24 may, if desired, form speaker and microphone ports. Speaker port 22 may be used when operating device 10 in speakerphone mode. Opening 23 may also form a speaker port. For example, speaker port 23 may serve as a telephone receiver that is placed adjacent to a user's ear during operation. In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown as being formed on the top face of electronic device 10 in the example of FIG. 1, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth® remote control, etc.).

Electronic device 10 may have ports such as port 20. Port 20, which may sometimes be referred to as a dock connector, 30-pin data port connector, input-output port, or bus connector, may be used as an input-output port (e.g., when connecting device 10 to a mating dock connected to a computer or other electronic device). Port 20 may contain pins for receiving data and power signals. Device 10 may also have audio and video jacks that allow device 10 to interface with external components. Ports may include power pins to recharge a battery within device 10 or to operate device 10 from a direct current (DC) power supply, data pins to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of electronic device 10 can be controlled using input interface devices such as touch screen display 16. Touch screen display 16 may be, for example, a capacitive multitouch touch screen.

Components such as display 16 and other user input interface devices may cover most of the available surface area on the front face of device 10 (as shown in the example of FIG. 1) or may occupy only a small portion of the front face of device 10. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antennas of electronic device 10 to function properly without being disrupted by the electronic components.

Examples of locations in which antenna structures may be located in device 10 include region 18 and region 21. These are merely illustrative examples. Any suitable portion of device 10 may be used to house antenna structures for device 10 if desired.

Figure 2:
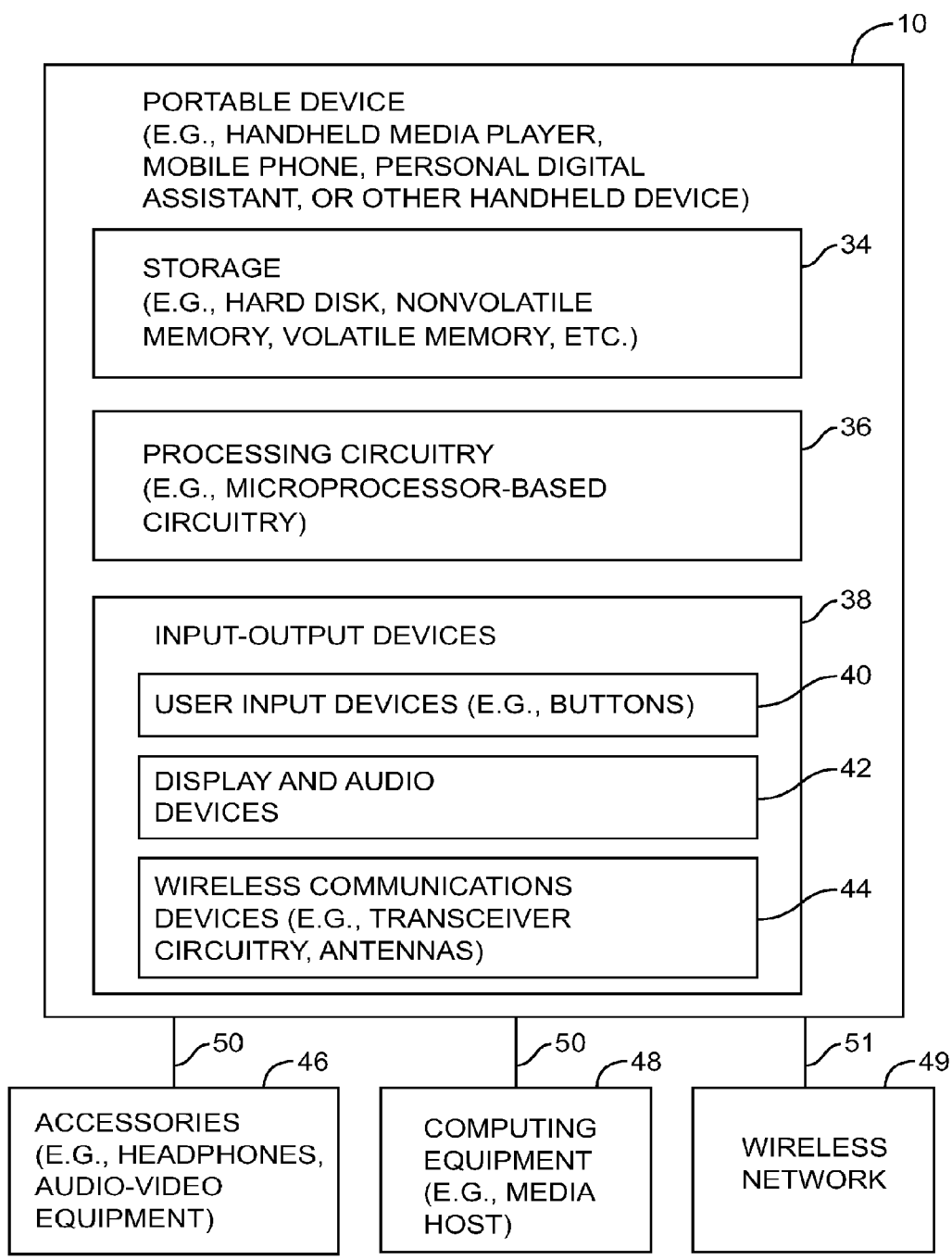
FIG. 2 is a schematic diagram of an illustrative portable electronic device in accordance with an embodiment of the present invention.

A schematic diagram of an embodiment of an illustrative portable electronic device such as a handheld electronic portable device is shown in FIG. 2. Portable device 10 may be a mobile telephone, a mobile telephone with media player capabilities, a handheld computer, a remote control, a game player, a global positioning system (GPS) device, a laptop computer, a tablet computer, an ultraportable computer, a hybrid device that includes the functionality of some or all of these devices, or any other suitable portable electronic device.

As shown in FIG. 2, device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 3G communications services (e.g., using wide band code division multiple access techniques), 2G cellular telephone communications protocols, etc.

To minimize power consumption, processing circuitry 36 may include power management circuitry to implement power management functions. During operation, the power management circuitry or other processing circuitry 36 may be used to adjust power supply voltages that are provided to portions of the circuitry on device 10. For example, higher direct-current (DC) power supply voltages may be supplied to active circuits and lower DC power supply voltages may be supplied to circuits that are less active or that are inactive.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, etc. A user can control the operation of device 10 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Device 10 can communicate with external devices such as accessories 46, computing equipment 48, and wireless network 49 as shown by paths 50 and 51. Paths 50 may include wired and wireless paths. Path 51 may be a wireless path. Accessories 46 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Wireless network 49 may include any suitable network equipment, such as cellular telephone base stations, cellular towers, wireless data networks, computers associated with wireless networks, etc. For example, wireless network 49 may include network management equipment that monitors the wireless signal strength of the wireless handsets (cellular telephones, handheld computing devices, etc.) that are in communication with network 49.

The antenna structures and wireless communications devices of device 10 may support communications over any suitable wireless communications bands. For example, wireless communications devices 44 may be used to cover communications frequency bands such as cellular telephone voice and data bands at 850 MHz, 900 MHz, 1800 MHz, 1900 MHz, and 2100 MHz (as examples). Devices 44 may also be used to handle the Wi-Fi® (IEEE 802.11) bands at 2.4 GHz and 5.0 GHz (also sometimes referred to as wireless local area network or WLAN bands), the Bluetooth® 1575 MHz.

Device 10 can cover these communications bands and other suitable communications bands with proper configuration of the antenna structures in wireless communications circuitry 44. Any suitable antenna structures may be used in device 10. For example, device 10 may have one antenna or may have multiple antennas. The antennas in device 10 may each be used to cover a single communications band or each antenna may cover multiple communications bands. If desired, one or more antennas may cover a single band while one or more additional antennas are each used to cover multiple bands. As an example, a pentaband cellular telephone antenna may be provided at one end of device 10 (e.g., in region 18) to handle 2G and 3G voice and data signals and a dual band antenna may be provided at another end of device 10 (e.g., in region 21) to handle GPS and 2.4 GHz signals. The pentaband antenna may be used to cover wireless bands at 850 MHz, 900 MHz, 1800 MHz, 1900 MHz, and 2100 MHz (as an example). The dual band antenna 63 may be used to handle 1575 MHz signals for GPS operations and 2.4 GHz signals (for Bluetooth® and IEEE 802.11 operations). These are merely illustrative arrangements. Any suitable antenna structures may be used in device 10 if desired.

To facilitate manufacturing operations, device 10 may be formed from two intermediate assemblies, representing upper and lower portions of device 10. The upper or top portion of device 10 may sometimes be referred to as a tilt assembly. The lower or bottom portion of device 10 may sometimes be referred to as a housing assembly.

The tilt and housing assemblies may each be formed from a number of smaller components. For example, the tilt assembly may be formed from components such as display 16 and an associated touch sensor. The housing assembly may include a plastic housing portion 12 and printed circuit boards. Integrated circuits and other components may be mounted on the printed circuit boards. During manufacturing, one end of the tilt assembly may be inserted into the housing assembly. The tilt assembly may then be rotated ("tilted") into place so that the upper surface of the tilt assembly lies flush with the upper edges of the housing assembly.

Figure 3:
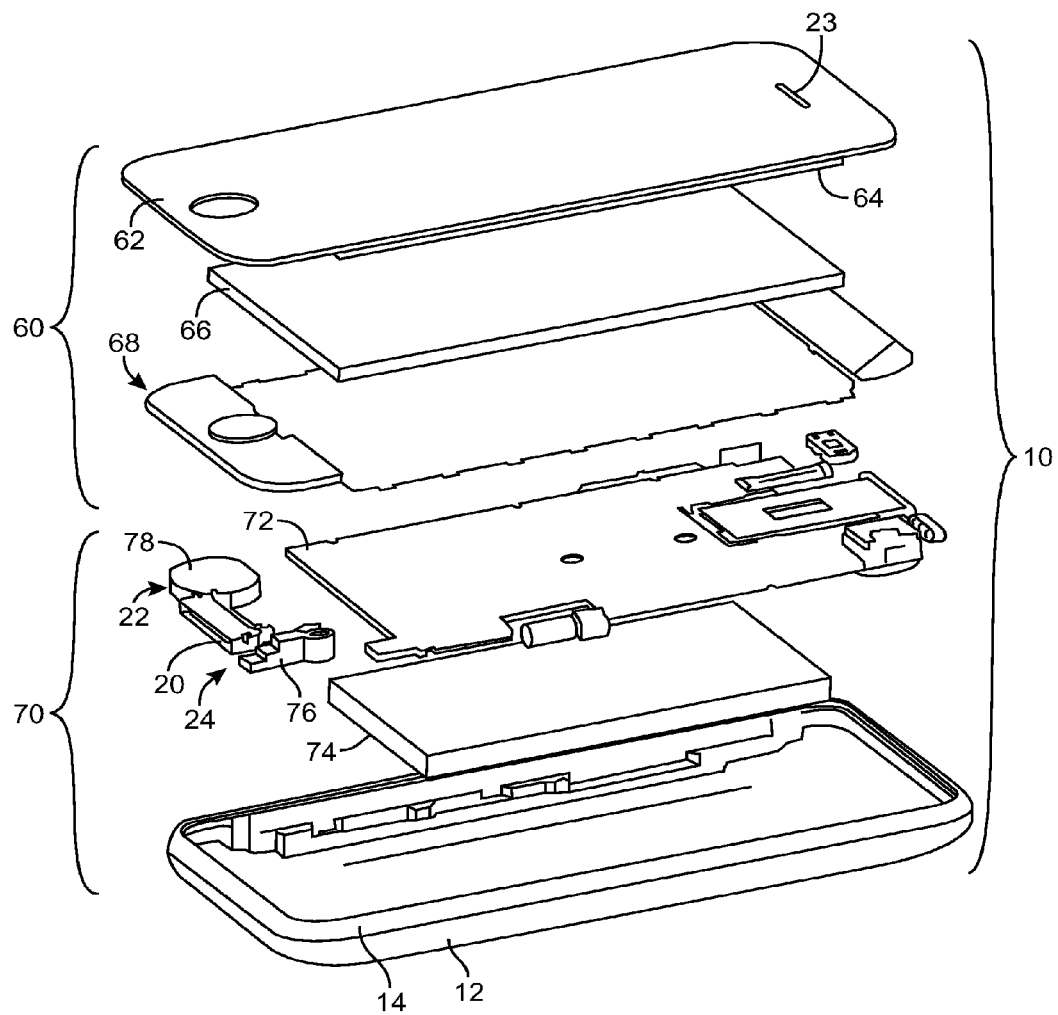
FIG. 3 is an exploded perspective view of an illustrative portable electronic device in accordance with an embodiment of the present invention.

An exploded perspective view showing illustrative components of device 10 is shown in FIG. 3.

Tilt assembly 60 (shown in its unassembled state in FIG. 3) may include components such as cover 62, touch sensitive sensor 64, display unit 66, and frame 68. Cover 62 may be formed of glass or other suitable transparent materials (e.g., plastic, combinations of one or more glasses and one or more plastics, etc.). Display unit 66 may be, for example, a color liquid crystal display. Frame 68 may be formed from one or more pieces. With one suitable arrangement, frame 68 may include metal pieces to which plastic parts are connected using an overmolding process. If desired, frame 68 may be formed entirely from plastic or entirely from metal.

Housing assembly 70 (shown in its unassembled state in FIG. 3) may include housing 12. Housing 12 may be formed of plastic and/or other materials such as metal (metal alloys). For example, housing 12 may be formed of plastic to which metal members are mounted using fasteners, a plastic overmolding process, or other suitable mounting arrangement.

As shown in FIG. 3, handheld electronic device 10 may have a bezel such as bezel 14. Bezel 14 may be formed of plastic or other dielectric materials or may be formed from metal or other conductive materials. An advantage of a metal (metal alloy) bezel is that materials such as metal may provide bezel 14 with an attractive appearance and may be durable. If desired, bezel 14 may be formed from shiny plastic or plastic coated with shiny materials such as metal films.

Bezel 14 may be mounted to housing 12. Following final assembly, bezel 14 may surround the display of device 10 and may, if desired, help secure the display onto device 10. Bezel 14 may also serve as a cosmetic trim member that provides an attractive finished appearance to device 10.

Housing assembly 70 may include battery 74. Battery 74 may be, for example, a lithium polymer battery having a capacity of about 1300 mA-hours. Battery 74 may have spring contacts that allow battery 74 to be serviced.

Housing assembly 70 may also include one or more printed circuit boards such as printed circuit board 72. Housing assembly 70 may also include components such as microphone 76 for microphone port 24, speaker 78 for speaker port 22, and dock connector 20, integrated circuits, a camera, ear speaker for port 23, audio jack, buttons, SIM card slot, etc.

Acoustic ports such as microphone port 24 and speaker ports 22 and 23 represent an interface between the exterior of device 10 and the interior of device 10. Acoustic components such as microphone and speaker components are housed in the interior of device 10. Microphones must receive sound from the exterior of device 10. Speakers must transmit sound to the exterior of device3 10. At the same time, unwanted incursions of foreign matter into the interior of device 10 should be prevented or at least minimized.

To maximize acoustic performance while protecting the interior of device 10 from foreign matter incursions, one or more of the acoustic ports in device 10 may be provided with structures that permit sound to pass while blocking unwanted matter. These structures may help to ensure that acoustic performance is not degraded while providing an attractive appearance to the exterior of device 10.

Figure 4:
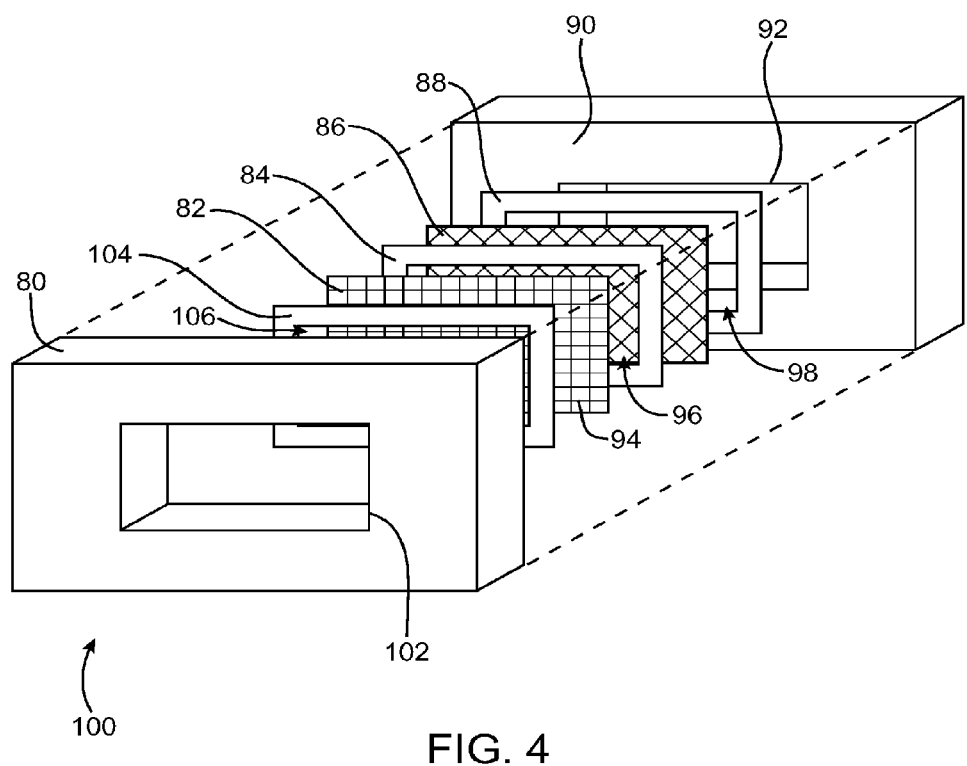
FIG. 4 is an exploded perspective view of a multilayer mesh arrangement that may be provided in an acoustic port such as a microphone or speaker port in accordance with an embodiment of the present invention.

Components in an illustrative acoustic port arrangement are shown in the exploded perspective view of FIG. 4. As shown in FIG. 4, port 100 may be formed from one or more holes such as hole 102 in a housing wall or other device structure 80. Port 100 may be, for example, a microphone port or a speaker port. There may be any suitable number of holes 102 associated with port 100. In the example of FIG. 4, a single hole 102 is associated with port 100. Structure 80 may be a housing wall (e.g., a portion of housing 12), a housing wall and other associated device structures (e.g., a housing wall and structures adjacent to the interior of the housing wall), a cover glass such as cover glass 64 (FIG. 3), or any other suitable structure that separates the interior of device 10 from the exterior of device 10. Openings such as opening 102 are generally exposed to air, when device 10 is in normal use.

Acoustic structures are mounted behind opening 102. In one suitable arrangement, which is described herein as an example, multiple layers of mesh are mounted behind opening 102. These layers lie between opening 102 and acoustic component 90. Acoustic component 90 may be a microphone or a speaker. Region 92 of component 90 may include an opening and an associated speaker or microphone diaphragm. Structures such as these may also be recessed further within acoustic component 90 if desired.

The acoustic structures that are mounted between opening 102 and opening 92 may include one or more layers of mesh-type structures that help prevent intrusion of foreign matter. In the illustrative configuration of FIG. 4, the outermost layer of acoustic material is mesh 82. Mesh 82, which may sometimes be referred to as a grill, may be formed of strands of metal or other suitable material (e.g., plastic). An advantage of using metal to form wires in mesh 82 is that metal tends to be durable and resistant to damage from environmental exposure. Metal also may be used to prevent an attractive appearance to users who are viewing port 100 from the exterior of device 10. Metal mesh 82 may be robust enough to withstand impact when a user attempts to clean opening 102 of port 100.

Any suitable mesh size may be used for mesh 82. For example, if mesh 82 is being used to cover a hole 102 that has lateral dimensions of about 2 mm (as an example), mesh 82 may be woven tightly enough to ensure that there are at least 10 or more strands of metal wire across the opening (i.e., the strand density may be a minimum of about 5 wires/mm). Larger strand densities (e.g., 20 wires/mm) may also be used, although care should be taken to maintain the strand density low enough to permit sound to readily pass through metal mesh 82 during operation of acoustic device 90. With one particularly suitable arrangement, mesh 82 is a #100 mesh having about a wire diameter of about 0.11 mm and a mesh hole size of about 0.14 mm (as an example).

If desired, the appearance of mesh 82 may be tailored by coating wires 94 or by using wires 94 with a particular appearance. Wires 94 may, for example, be formed from a shiny substance such as brass or stainless steel or may be coated with a color (e.g., colored paint or colored plastic jacket materials). Combinations of colored and shiny wires may also be used.

One or more layers of acoustic mesh may be included in the acoustic structures between opening 102 and region 92. In the example of FIG. 4, a single layer 86 of acoustic mesh is shown. Acoustic mesh 86, which may sometimes be referred to as speaker fabric, may be used to adjust the acoustic impedance properties of metal mesh 82 and may help to block fine particles such as those that might not otherwise be blocked by metal mesh 82. Illustrative acoustic mesh materials that may be used for acoustic mesh layer 86 include the woven polyester and woven polyester/PVC-on-polyester fabrics referred to as AcousTex® fabric available from AcousTex Fabrics of Burlington, Mass. In general, acoustic mesh material may be formed from any suitable fabric material that exhibits satisfactory acoustic performance (e.g., sound transparency of 90% or more, etc.). Such acoustic fabrics generally have mesh openings that are smaller than the openings of the cosmetic metal mesh 82. Such acoustic fabrics are also generally formed from non-metallic (e.g., nonconductive) materials.

When both metal mesh 82 and acoustic mesh 86 are used together in port 100, performance may be enhanced. For example, acoustic mesh 86 may help improve the acoustics of port 100. At the same time, metal mesh 82 may improve the appearance and robustness of port 100 beyond what would otherwise be achieved using only acoustic mesh 86.

Any suitable fastening arrangement may be used to secure the layers of mesh for port 100. For example, layers of adhesive film (double-sided tape) may be interposed between the mesh layers. The adhesive film may be based on a metal film or plastic foil or any other suitable backing material coated with a pressure sensitive adhesive. These layers may be provided in the form of strips surrounding the periphery of port openings such as opening 102, may be provided in the form of rings that surround each port opening, or may be provided in any other suitable shape. In the example of FIG. 4, adhesive film layers are provided in the form of ring-shaped layers that surround opening 102. Adhesive film layer 104 may help secure metal mesh 82 to the interior surface of device structure 80. Adhesive ring 84 may be used to adhere acoustic mesh 86 to metal mesh 82. Adhesive ring layer 88 may be used to attach acoustic mesh layer 86 to acoustic device 90. The openings in these rings (e.g., openings 106, 96, and 98) may be aligned with opening 102 and region 92. If desired, adhesive may be used to secure component 90 to structure 80 (e.g., in addition to or instead of using adhesive 104).

If desired, other fastening mechanisms may be used to secure the layers of mesh for port 100. For example, mesh layers may be held in place by screws or other fasteners, by liquid adhesive (e.g., adhesive not associated with layers of film), by confining the layers between structure 80 and component 90 using pressure, or using any other suitable arrangement. The use of adhesive film layers is merely illustrative.

An advantage of using layers of adhesive film is that such layers may help to prevent damage to device structures from contact with wires 94 of mesh 82. For example, in configurations in which structure 80 forms a glass cover (e.g., cover glass 62 of FIG. 3), adhesive film such as adhesive film 104 of FIG. 4 may help prevent wires 94 from scratching the underside of the glass.

Figure 5:
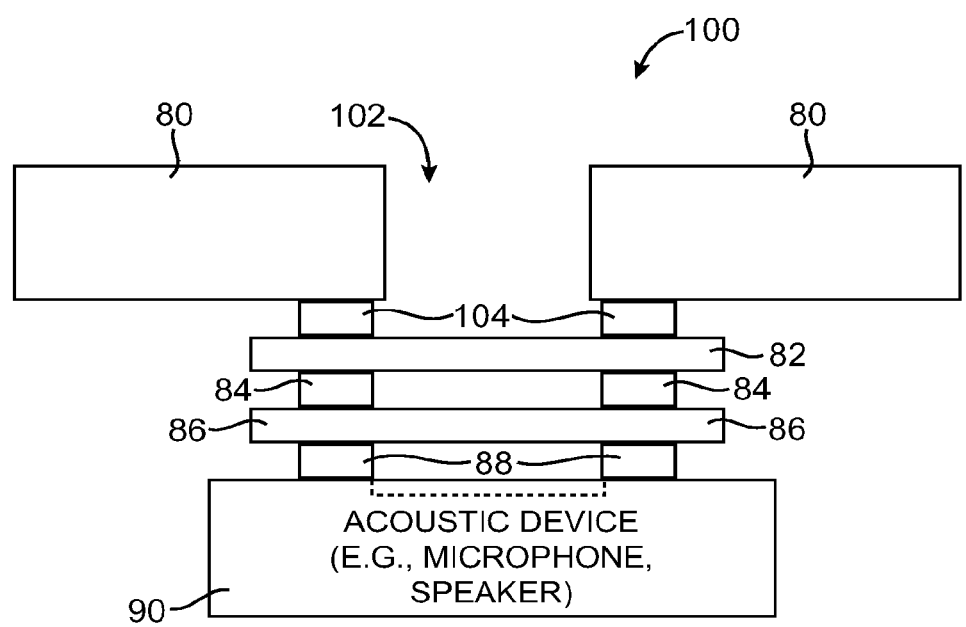
FIG. 5 is a cross-sectional side view showing illustrative layers of material that may be included in an acoustic port in accordance with an embodiment of the present invention.

A cross-sectional view of an illustrative port 100 that has layers of mesh is shown in FIG. 5. As shown in FIG. 5, metal mesh layer 82 may be located adjacent to opening 102 in structure 80. Opening 102 may be associated with microphone port 24 (FIG. 1), speakerphone speaker port 22 (FIG. 1), receiver speaker port 23 (FIG. 1), or any other suitable acoustic port. Acoustic mesh layers such as layer 86 of FIG. 5 may be interposed between metal mesh 82 and a microphone or speaker (acoustic device 90).

Figure 6:
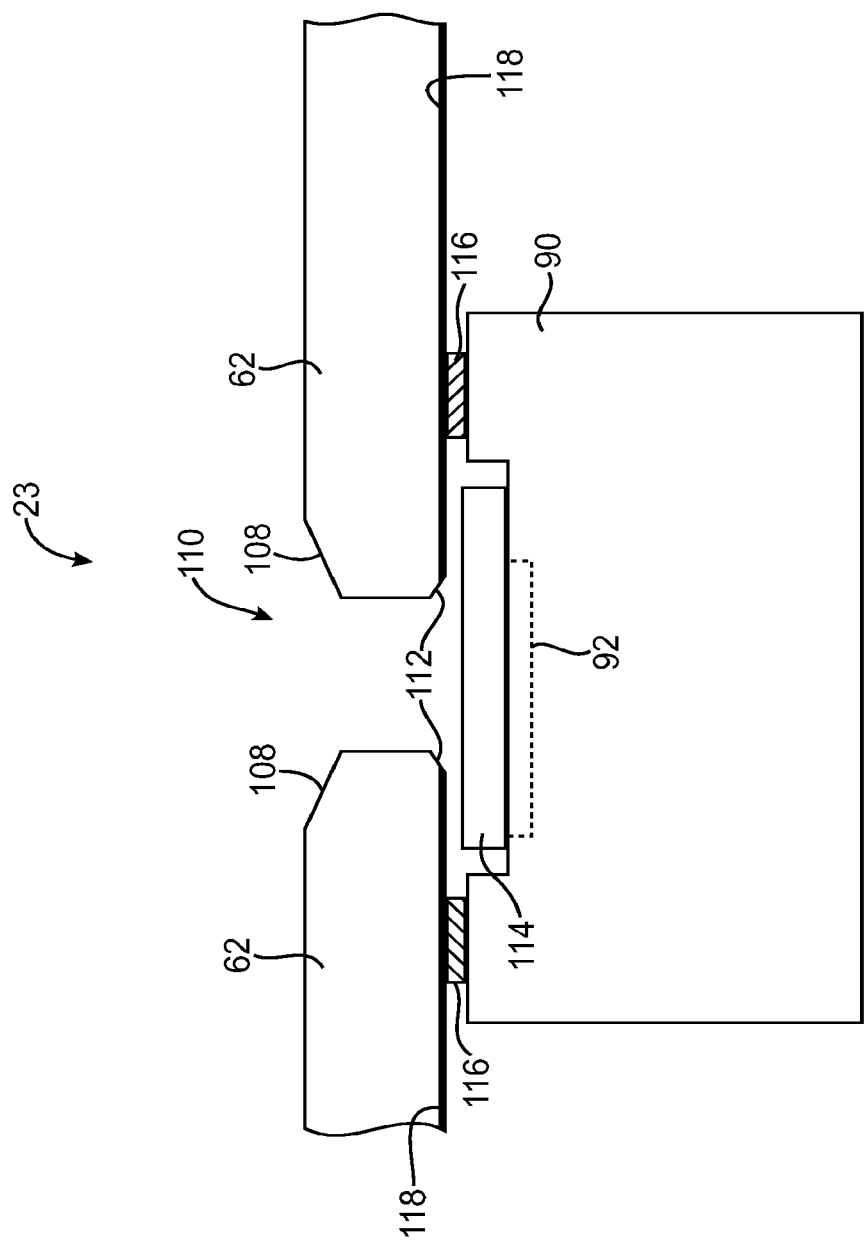
FIG. 6 is a cross-sectional side view of an illustrative acoustic port with a chamfered opening in accordance with an embodiment of the present invention.

If desired, an opening may be provided in a structure such as cover glass 62 (FIG. 2). This type of opening may be used, for example, to form a receiver port such as receiver port 23. As shown in FIG. 6, receiver port 23 may be formed from an opening 110 in cover glass 62 that is aligned with acoustic structure 92 of acoustic device 90. Acoustic structure 92 may be, for example, a microphone diaphragm or a speaker cone. Structures 114 may include a durable protective outer mesh such as wire mesh 82 of FIG. 4 and a less durable and more finely woven inner mesh such as mesh 86 of FIG. 4. Because the holes of the inner mesh are smaller than the holes of the outer mesh, the inner mesh helps to trap particles that might otherwise pass through the holes of the outer mesh. The inner mesh may also be chosen for its acoustic impedance properties (e.g., to tune the acoustic impedance properties of the acoustic port).

As shown in FIG. 6, opening 100 in glass 62 may have associated chamfers such as outer surface chamfers 108 and inner surface chamfers 112. Chamfers 108 may be used to guide sound in and out of port 23. Chamfers 112 may also be used to guide sound into and out of port 23 and may improve the acoustics of port 23. Moreover, inner chamfers 112 may help to lower stress in structure 62, thereby reducing the likelihood of chips in structure 62 in the vicinity of opening 110.

Adhesive layers such as double-sided adhesive film layer 116 may be used to help prevent metal mesh 82 from damaging structure 62. For example, structure 62 may be a clear glass cover that is coated on its underside with a somewhat fragile layer of black ink 118 or other coating. To prevent the wires of mesh 82 (FIG. 4) in structure 114 from scratching ink 118, adhesive film layer 116, which may be interposed between acoustic component 90 and the lower surface of structure 62 may be used to create a vertical offset between ink 118 and structure 114. If desired, adhesive film (e.g., adhesive film 104 of FIG. 4) may be interposed between metal mesh 82 and ink 118 in addition to or instead of relying on the space created by the thickness of layer 116 to protect ink 118.

Device 10 may include a fully sealed speaker box. Fully enclosed speakers may have improved acoustic performance relative to speakers that are not enclosed. However, speakers that are mounted within sealed speaker enclosures may be susceptible to damage. In particular, upon exposure to air pressure changes such as the pressure changes associated with airplane travel, the diaphragm of a speaker that is mounted in a completely sealed speaker box may be damaged from excessive internal air pressure. In accordance with an embodiment of the present invention, damage of this type may be avoided by forming a thin slit or other air vent opening in the speaker box. The air vent may allow air to escape from the speaker box so that air pressures on either side of the speaker diagram are equalized and damage from overpressuring one side of the speaker relative to the other is avoided.

Figure 7:
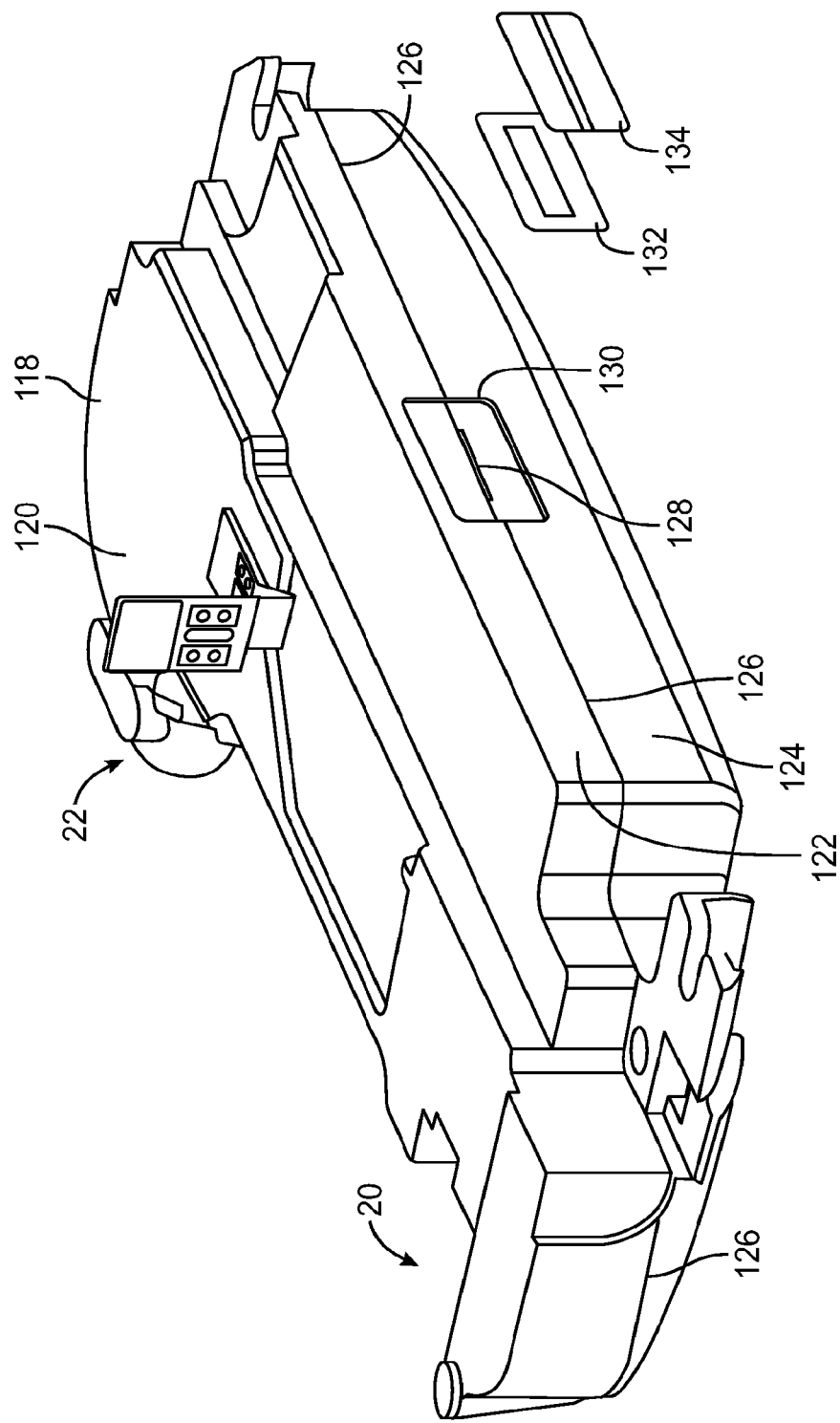
FIG. 7 is a perspective view of an illustrative speaker box with a vent hole in accordance with an embodiment of the present invention.

An illustrative speaker enclosure 118 that may be used in device 10 is shown in FIG. 7. Enclosure 118 may be formed from plastic or other suitable materials. For example, enclosure 118 may be formed from an upper plastic half 122 and a lower plastic half 124 which are joined along seam 126 during manufacturing.

The interior of enclosure 118 may be hollow. Microphone 76 and speaker 78, which are shown in FIG. 3, may be mounted to enclosure 118. For example, microphone 76 may be mounted to an exterior portion of enclosure 118 in the vicinity of microphone port 20. Speaker 78 may be mounted in the hollow interior of enclosure 118 under region 120 in the vicinity of speaker port 22. Speaker 78 may have electrical terminals that are connected to audio circuitry in device 10. Speaker 78 may also have an actuator and a diaphragm that is driven by the actuator to produce sound. The diaphragm may be formed from paper, plastic film, or any other suitable material or combinations of such materials. When mounted within enclosure 118, one side of the speaker diaphragm may be exposed to the exterior of enclosure 118 through the opening of speaker port 22 and the opposing side of the speaker diaphragm may be exposed to the sealed interior of enclosure 118.

The substantially sealed nature of enclosure 118 forms a "closed-box" speaker architecture. In this type of architecture, the enclosed air serves as a spring that helps to drive the speaker accurately during use. The use of sealed enclosure 118 therefore helps to improve acoustic performance for speaker 76. However, the sealed nature of enclosure 118 poses a challenge as device 10 is placed in environments of varying pressure. If a sealed speaker box is maintained at sea level for an extended period of time, the pressure inside the box will equilibrate to atmospheric pressure at sea level. If the sealed speaker box is then rapidly taken to a lower pressure environment (e.g., in an airplane), the diagram of the speaker may be damaged by the high internal pressure of the box relative to the lower environmental pressure outside of the box.

Enclosure 118 of FIG. 7 avoids this potentially damaging situation by use of a vent such as vent slit 128. Vent slit 128 may be provided in the form of a relatively long and narrow opening between the interior and exterior of enclosure 118. When atmospheric pressure is reduced outside of enclosure 118, air can escape through vent slit 128. This equalizes the pressure on both sides of the speaker diaphragm and prevents damage. At the same time, vent slit 128 is preferably not too large, so that acoustically enclosure 118 continues to operate as a closed speaker box.

Vent 128 may be formed in any suitable shape. For example, vent 128 may be formed from a circular opening, an oval opening, a polygonal opening, multiple holes, etc. An advantage of using a slit-shaped (substantially rectangular) opening is that this allows vent 128 to be formed by creating mating recesses in enclosure housing portions 122 and 124. These recesses may be formed as part of a plastic molding process used to fabricate speaker box housing portions 122 and 124, thereby avoiding the necessity for machining vent 128.

Vent 128 may be covered with an acoustic mesh 134. Acoustic mesh 124 may help to raise the acoustic impedance of vent 128, so that speaker enclosure 118 acts as a completely closed speaker box, while permitting air to flow in and out of the interior of enclosure 118 to accommodate environmental pressure changes. Mesh 124 may be mounted to enclosure 118 within recessed region 130 using a ring of adhesive film (double-sided tape) 132 or other suitable attachment mechanism.

Figure 8:
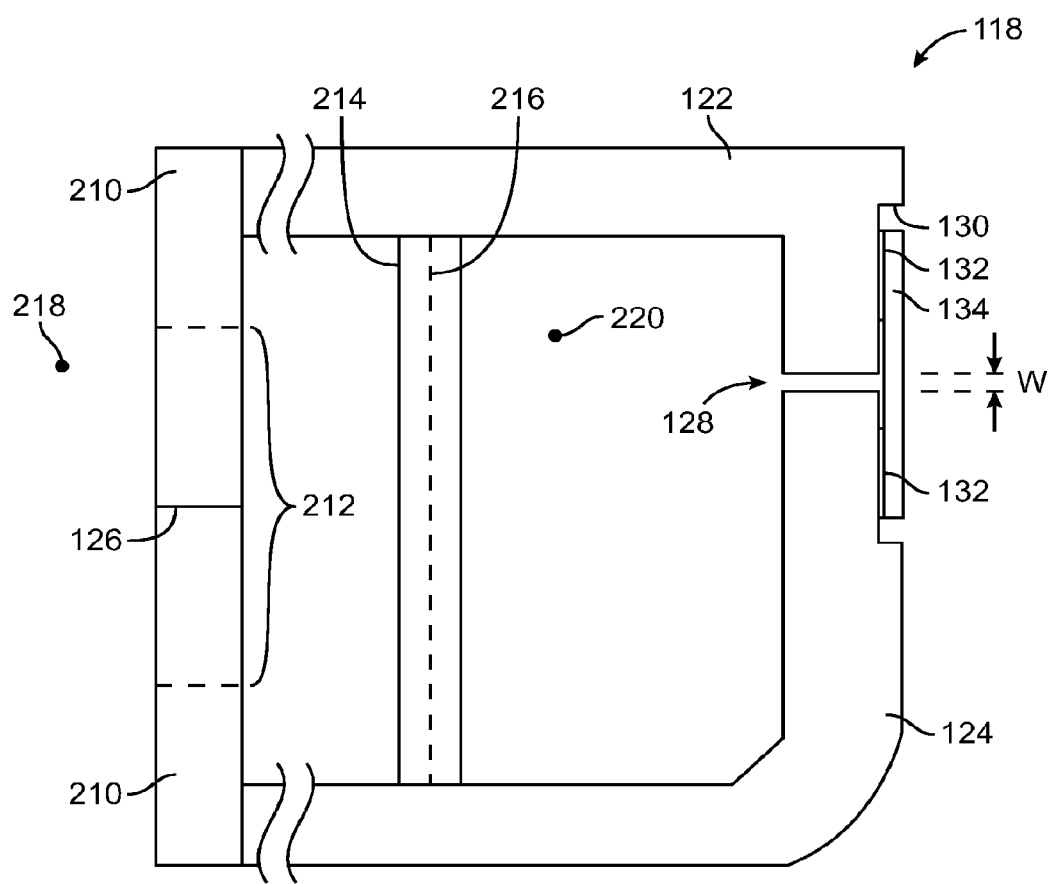
FIG. 8 is a cross-sectional side view of an illustrative vent in a speaker enclosure in accordance with an embodiment of the present invention.

A cross-sectional side view of an enclosure such as enclosure 118 in the vicinity of vent opening 128 is shown in FIG. 8. Narrow vent dimension W may be, for example, 0.2 mm. The vent length (perpendicular to dimension W) may be 10 mm (as an example). Speaker enclosure housing wall 210 may have a hole such as hole 212. Hole 212 may form an opening for speaker port 22 (FIG. 7). Speaker 214 may be mounted within enclosure 118 so that one side of speaker diaphragm 216 is exposed to the exterior of speaker enclosure 118 and device 10 (e.g., exterior location 218) and the other side of speaker diaphragm 216 is exposed to the interior of speaker diaphragm 216 (e.g., interior location 220).

In the example of FIGS. 7 and 8, opening 128 is formed from a vent slit in enclosure 118 that is covered by a separate air-permeable structure (mesh 134). In this type of arrangement, the opening between the interior of enclosure 118 and the exterior of enclosure 118 is formed both by the outline of the vent slit and by the holes in mesh 134. If desired, opening 128 may be formed exclusively from holes that are formed as an integral part of enclosure 118. This type of arrangement is shown in FIG. 9.

Figure 9:
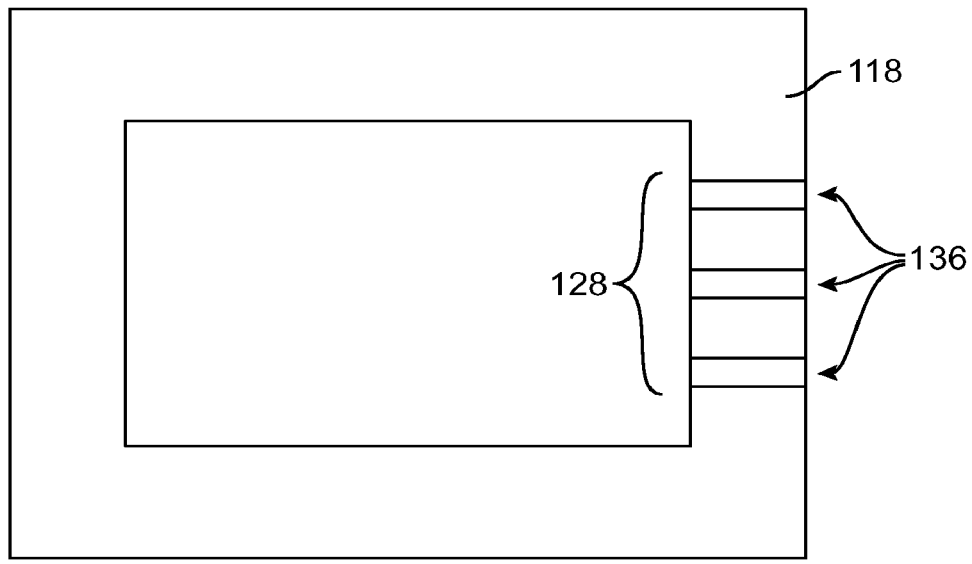
FIG. 9 is a cross-sectional side view of an illustrative speaker enclosure with a multipole vent structure in accordance with an embodiment of the present invention.

As shown in FIG. 9, enclosure 118 may have holes 136 that are formed directly though the walls of enclosure 118. There may be any suitable numbers of holes 136 (e.g., tens of holes or more). Each hole may have a cross-section that is relatively small in area (e.g., 0.1 mm$^2$ or less as an example). An opening formed from holes such as these may sometimes be referred to as a microperf opening. Holes 136 may be formed by mechanical drilling, by molding, by laser drilling, or using any other suitable technique.

Figure 10:
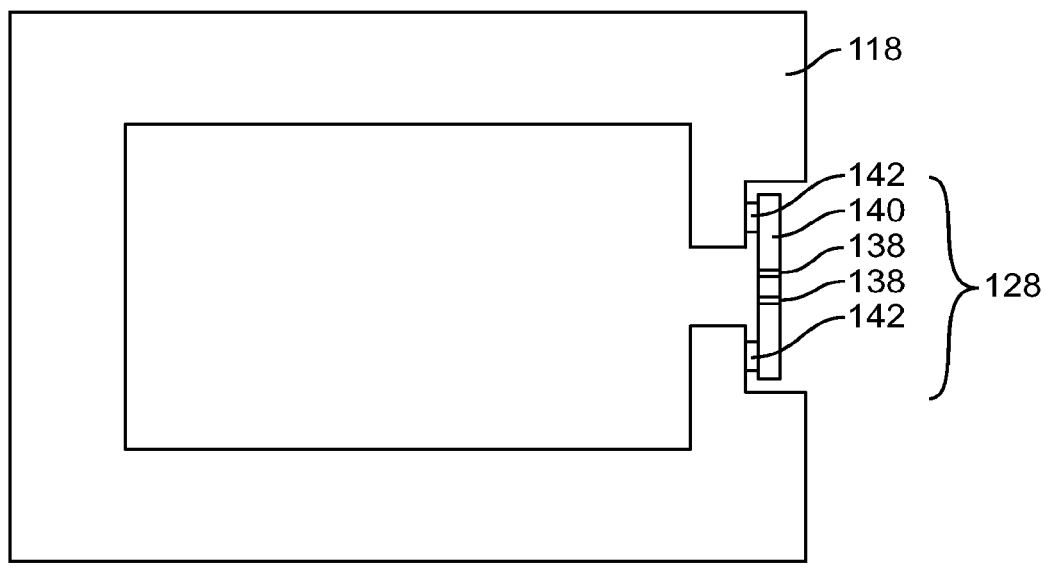
FIG. 10 is a cross-sectional side view of an illustrative speaker enclosure with a separate vent hole structure that has been attached to one side of the speaker enclosure in accordance with an embodiment of the present invention.

As shown in FIG. 10, vent opening 128 may be formed from a separate structure 140 into which a number of discrete holes 138 have been formed. Structure 140 may, for example, be a metal plate or a plastic structure. Holes 138 may be relatively small in area (e.g., 0.1 mm$^2$ or less as an example) and may be formed by mechanical drilling, molding, laser drilling, etc. Structure 140 may be attached to the housing walls of enclosure 118 using adhesive 142 or other suitable attachment mechanisms.

Figure 11:
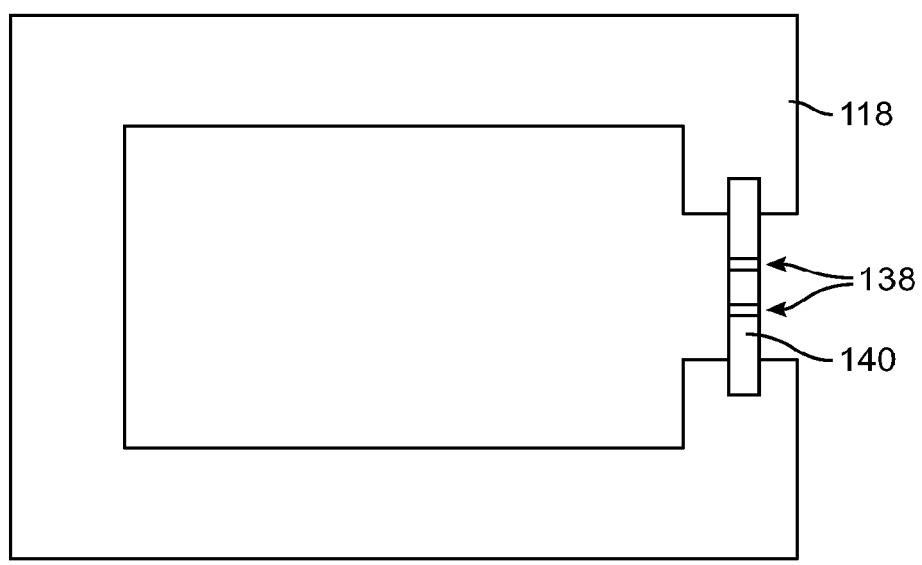
FIG. 11 is a cross-sectional side view of an illustrative speaker enclosure with a vent hole structure to which a speaker enclosure has been attached using an overmolding process in accordance with an embodiment of the present invention.

If desired, a structure such as structure 140 may be connected to enclosure 118 using a plastic overmolding process. This type of arrangement is shown in the cross-sectional view of FIG. 11. As with holes 138 of FIG. 10, holes 138 of FIG. 11 may be relatively small in area (e.g., 0.1 mm$^2$ or less as an example) and may be formed by mechanical drilling, molding, laser drilling, etc. Structure 140 may be formed from metal, plastic, or other suitable material.

Figure 12:
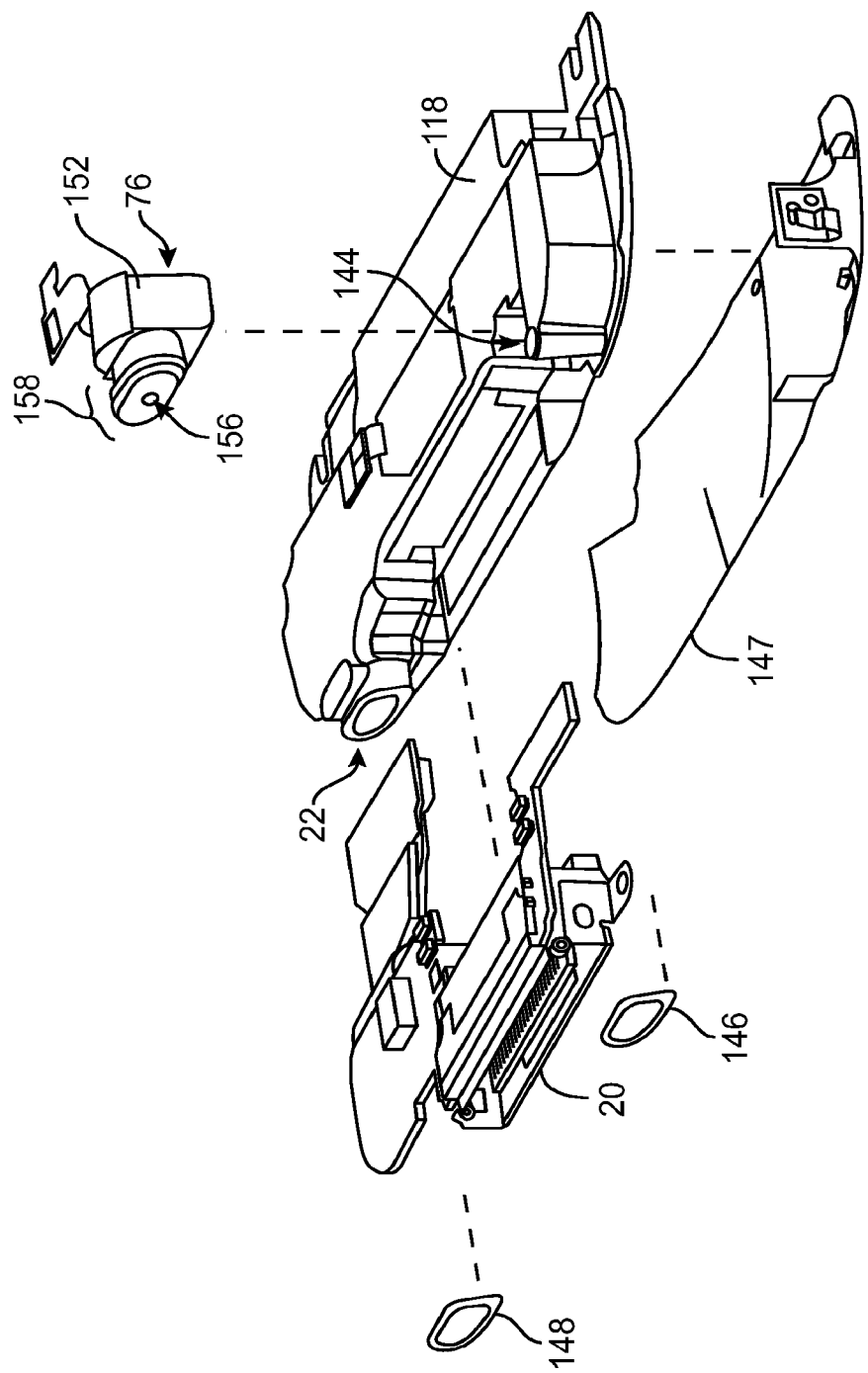
FIG. 12 is an exploded perspective view of an illustrative speaker enclosure and associated components in accordance with an embodiment of the present invention.

An exploded perspective view of speaker enclosure 118 and associated components in device 10 is shown in FIG. 12. As shown in FIG. 12, components such as antenna flex 147 and dock connector 20 (and associated flex paths and circuit components) may be mounted on speaker enclosure 118. In this capacity, speaker enclosure 118 may serve as a unifying structure for multiple parts of device 10. This can ease the task of assembling device 10.

Speaker box 118 may have portions defining an opening for speaker port 22. A mesh cover 148 (e.g., metal mesh) may be placed over opening 22. If desired, a layer of acoustic mesh such as mesh 86 of FIG. 4 may be placed behind mesh 148. Mesh 146 (e.g., a metal mesh) may be used to cover microphone 76. If desired, a layer of acoustic mesh such as mesh 86 may also be placed behind mesh 146.

Microphone 76 may have an associated elastomeric structure 152 (sometimes referred to as a "boot"). Structure 152 may be formed of any suitable material. With one suitable arrangement, structure 152 is formed from a soft material such as silicone, which allows structure 152 to form good environmental seals with portions of device 10.

During assembly, microphone boot 152 may be mounted in a mating hole 144 within speaker enclosure 118. Hole 144 may have features that engage boot 152 and that help to form seals between boot 152 and device 10. These seals and associated seals formed between boot 152 and the walls of housing 12 may help prevent intrusion of moisture or particles into the interior of device 10. Region 158 of boot 152 may have one or more sealing features such as raised ribs. These sealing features may help to enhance the quality of the seal formed between boot 152 and plastic housing 12. One or more holes such as hole 156 may be used to allow sound to enter microphone 76.

Figure 13:
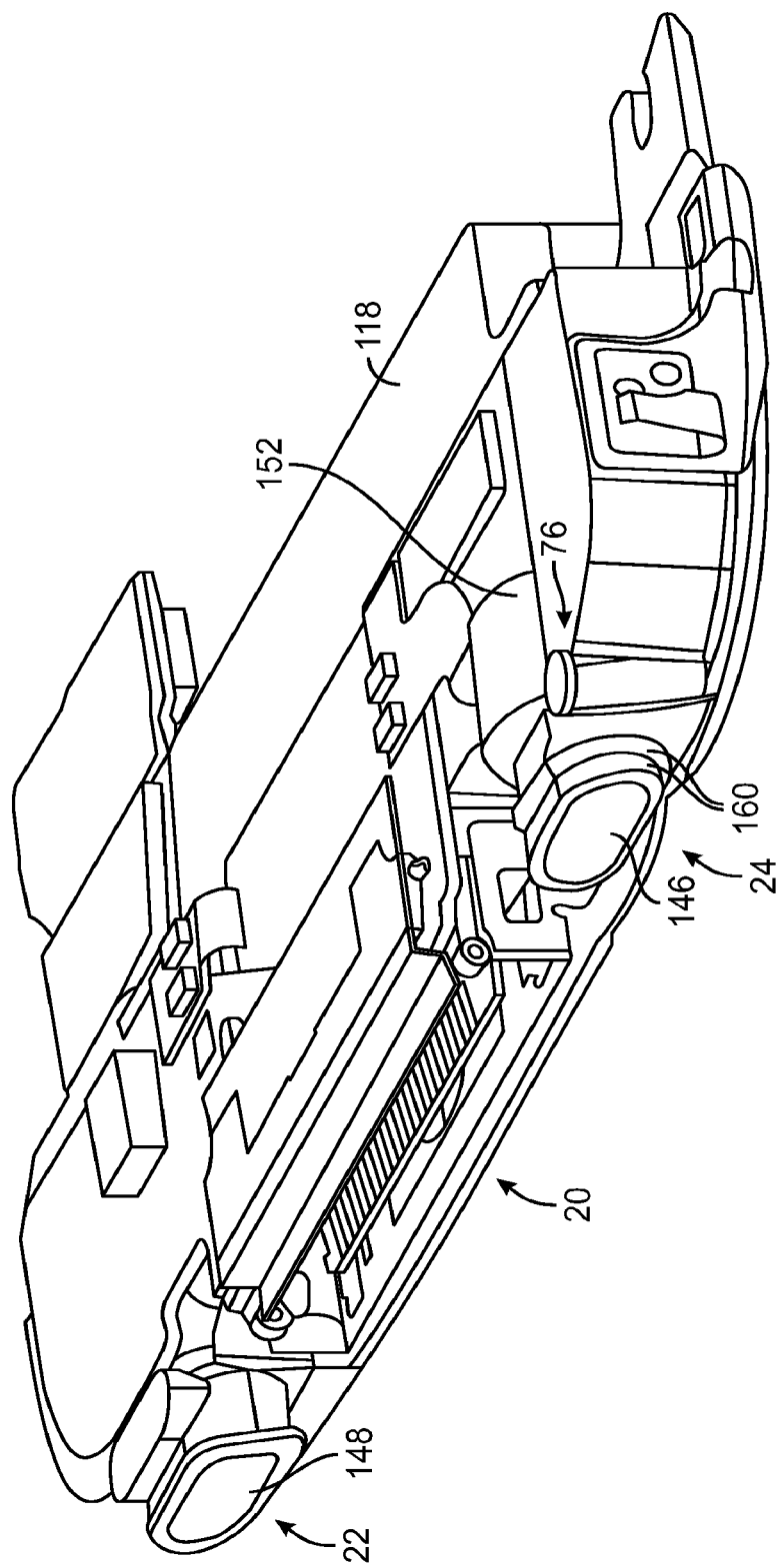
FIG. 13 is a perspective view of an illustrative speaker enclosure and associated components in accordance with an embodiment of the present invention.

As shown in FIG. 13, microphone boot 152 may have sealing features such as raised ribs 160. There are two ribs 160 in the example of FIG. 13. In general, boot 152 may have any suitable number of ribs. Moreover, these sealing features may have any suitable shape. It may be desirable (as shown in FIG. 13) to form ribs 160 completely around boot 152 to completely seal the inner surface of port 24.

At its front end 186 (FIG. 14), microphone boot 152 may form environmental seals with housing 12. At rear end 192 (FIG. 15), microphone boot 152 may form environmental seals with microphone unit 190.

Figure 14:
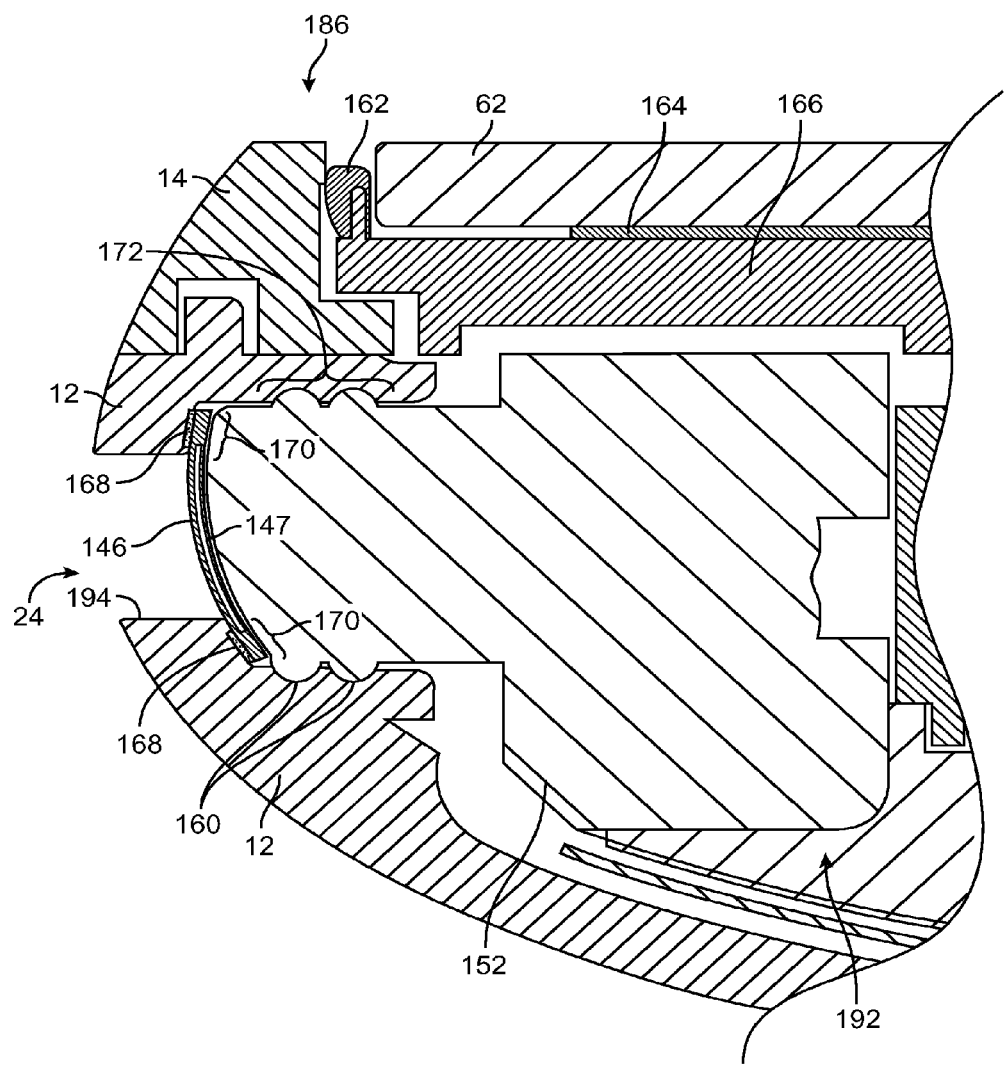
FIG. 14 is a cross-sectional side view of a microphone boot structure showing a microphone-boot-to-housing seal in accordance with an embodiment of the present invention.

As shown in FIG. 14, housing 12 may have an opening 194 that forms microphone port 24. Metal mesh 146 may be mounted to an inner surface of housing 12 using a ring of adhesive film 168 or other suitable attachment arrangement. As described in connection with FIG. 4, a layer of acoustic mesh such as acoustic mesh 147 may be mounted behind metal mesh 146. Boot 152 may bear against acoustic mesh 147 in regions 170, thereby forming a face seal within housing 12 that helps to prevent intrusion of foreign matter into the interior of housing 12. A radial seal is formed by raised ribs 160 and adjacent portions of boot 152 in region 172.

As shown in FIG. 14, bezel 14 may be connected to housing 12. A gasket 162 may help to separate cover glass 62 from bezel 14. Cover glass 62 may be mounted on frame 166 using adhesive 164.

Figure 15:
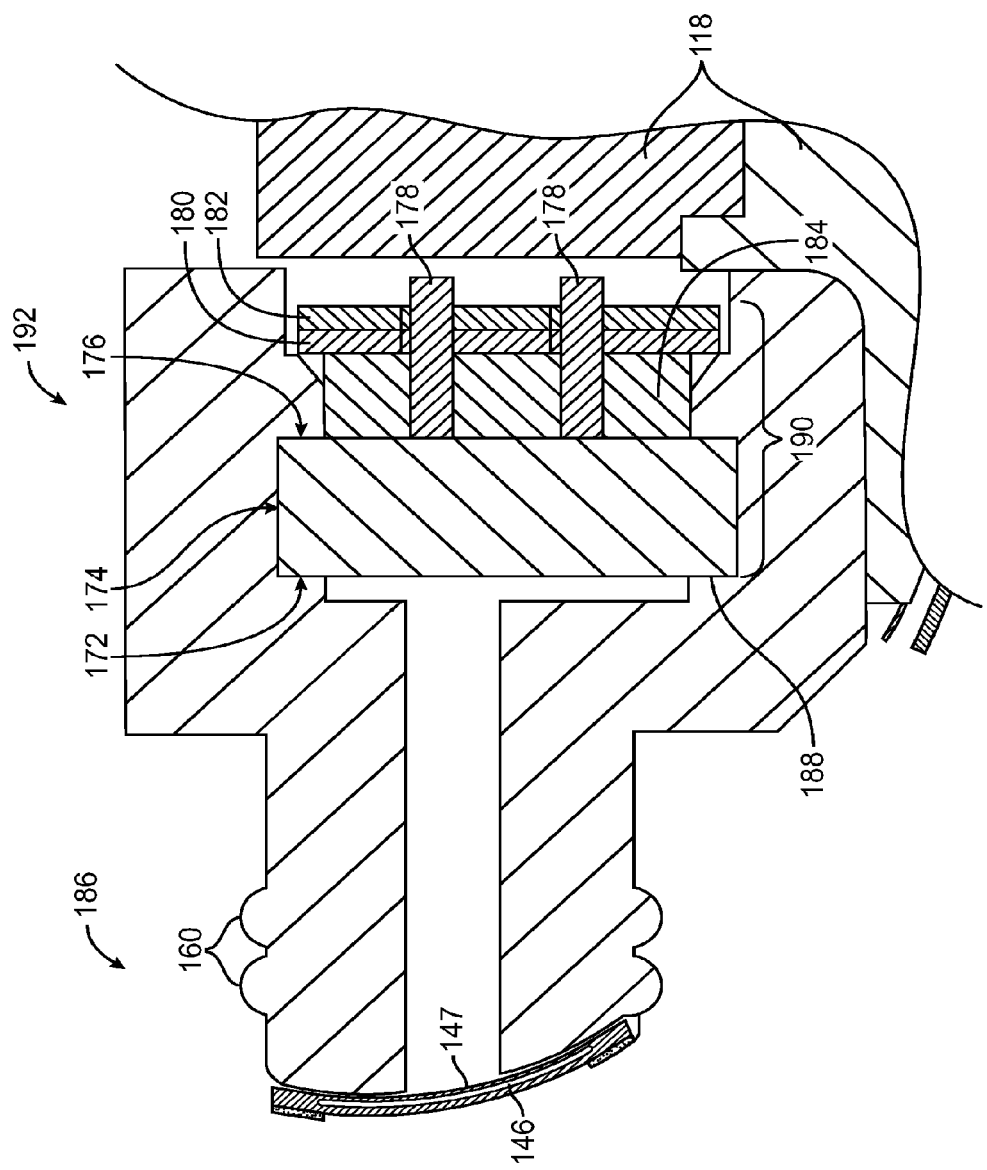
FIG. 15 is a cross-sectional side view of a microphone boot structure showing a microphone-boot-to-microphone seal in accordance with an embodiment of the present invention.

At the rear of microphone boot 152, boot 152 forms seals with microphone unit 190 as shown in FIG. 15. Microphone unit 190 may include microphone element 188, terminal support structure 184, stiffener 180 (e.g., polyimide), and flex printed circuit 182. Terminals 178 may protrude through support 184, stiffener 180, and flex circuit 182. Flex printed circuit 182 may include conductive traces for routing microphone signals to and from the terminals of microphone unit 190.

To prevent intrusion of foreign matter, microphone unit 190 may form environmental seals with boot 152. In particular, the front face, rear face, and the surfaces between the front and rear faces of microphone element 188 may form front face seal 172, radial seal 174, and rear face seal 176, respectively. These seals between microphone unit 190 and boot 152 ensure that end 192 is well sealed.

To ensure that the front radial seal formed using sealing features such as raised ribs 160 is satisfactory, housing 12 may have recesses that mate with the sealing features of boot 152. As shown in FIG. 16, when boot 152 has semicircular raised ribs, housing 12 may be provided with mating semicircular recesses 196 (as an example). FIG. 17 shows an illustrative exit hole 156 through boot 152 and shows how ribs 160 may surround boot 152.

If desired, other shapes may be used for the radial seal sealing features of boot 152. FIG. 18 shows an arrangement in which boot 152 has semicircular recesses 200 and housing 12 has mating semicircular protrusions 198. FIG. 19 shows an arrangement in which boot 152 has raised triangular features 204 and housing 12 has triangular recesses. In FIG. 20, boot 208 has a protrusion with a square profile 208 that mates with a square-profile recess 206 in housing 12. If desired, arrangements such as the arrangements of FIGS. 19 and 20 may be inverted (e.g., with triangular recesses in boot 152 or square recesses in boot 152). The arrangements of FIGS. 16-20 may be used in any combination and any suitable number of radial seal sealing features of this type may be used to help form environmental seals for boot 152. Sealing features such as these may also be used in rear portion 192 (e.g., to form seals between microphone unit 190 and boot 152).

The foregoing is merely illustrative of the principles of this invention and various modifications can be made by those skilled in the art without departing from the scope and spirit of the invention.

What is claimed is:

1. A microphone structure for a portable electronic device having a housing, comprising:
    a microphone unit;
    an elastomeric microphone boot coupled to the microphone unit, the elastomeric microphone boot:
        defining an opening that permits sound to enter the microphone unit from outside of the housing; and
        forming a rear seal with a rear surface of the microphone unit; and
    a metal mesh coupled to the opening.

2. The microphone structure of claim 1, wherein the microphone boot further comprises a front face seal portion that forms a front face seal with a front surface of the microphone unit.

3. The microphone structure of claim 2, wherein the microphone boot further comprises a radial seal portion that forms a radial seal with the microphone unit and wherein the radial seal is located between the front face seal and the rear face seal.

4. The microphone structure of claim 1, further comprising a fabric layer located between the opening and the metal mesh.

5. The microphone structure of claim 1, wherein the microphone boot further comprises a radial seal portion that forms a radial seal with the housing.

6. The microphone structure of claim 5, wherein the radial seal portion comprises raised ribs.

7. The microphone structure of claim 1, further comprising a fabric layer coupled to the metal mesh.

8. A microphone structure comprising:
    a first layer of mesh;
    a second layer of mesh coupled to the first layer of mesh;
    a microphone unit; and
    an elastomeric microphone boot coupled to the microphone unit to form an environmental seal with the microphone unit and coupled to one or more portions of the second layer of mesh.

9. The microphone structure of claim 8, wherein the second layer of mesh is an acoustic mesh.

10. The microphone structure of claim 8, wherein the first layer of mesh is a metal mesh that comprises holes of a first size and wherein the second layer of mesh comprises holes of a second size that are smaller than the holes of the first size.

11. The microphone structure of claim 8, further comprising a radial seal portion that forms a radial seal with a housing.

12. The microphone structure of claim 11, wherein the radial seal portion comprises one or more raised ribs.

13. The microphone structure of claim 12, wherein the one or more raised ribs are configured to mate with corresponding recesses of the housing.

14. The microphone structure of claim 8, wherein the first layer of mesh comprises one or more wires that alter the appearance of the first layer of mesh.

15. A microphone assembly comprising:
    a first layer of mesh;
    a second layer of mesh coupled to the first layer of mesh;
    a microphone unit; and
    an elastomeric microphone boot having a first end and a second end, wherein:
        the first end comprises one or more structures that mate with corresponding structures of a housing portion of an electronic device to form an environmental seal; and
        the second end forms a rear seal with a rear surface of the microphone unit to form an environmental seal.

16. The microphone assembly of claim 15, wherein the second layer of mesh is an acoustic mesh.

17. The microphone assembly of claim 15, wherein the first layer of mesh is a metal mesh that comprises holes of a first size and wherein the second layer of mesh comprises holes of a second size that are smaller than the holes of the first size.

18. The microphone assembly of claim 15, wherein the one or more structures of the first end are recesses and wherein the corresponding structures of the housing portion are protrusions.

19. The microphone assembly of claim 15, wherein the one or more structures of the first end are raised ribs and wherein the corresponding structures of the housing portion are recesses.

20. The microphone assembly of claim 15, wherein the second layer of mesh is a fabric.

21. An acoustic assembly for a portable device, comprising:
    an enclosure defining a vent formed from multiple holes, each of which are less than 0.1 mm$^2$ in area; and
    an acoustic component disposed within the structure; wherein
    the multiple holes permit air pressure to equalize between an interior and exterior of the enclosure.

22. The acoustic assembly of claim 21, wherein the multiple holes are laser-drilled.

23. The acoustic assembly of claim 21, wherein the enclosure is a closed acoustic environment.

24. The acoustic assembly of claim 21, further comprising a mesh overlying the vent.

25. The acoustic assembly of claim 21, wherein the enclosure is made from one of metal or plastic.

26. The acoustic assembly of claim 21, wherein each of the multiple holes are rectangular.

27. The acoustic assembly of claim 21, further comprising a boot connected to the enclosure and forming a seal with a portion of the enclosure.

28. An electronic device, comprising:
    a housing;
    an acoustic enclosure positioned within the housing;
    a boot positioned within the housing and forming a seal with a portion of the acoustic enclosure; and
    a group of holes formed through the acoustic enclosure; wherein
    the group of holes allows air flow between an interior and exterior of the acoustic enclosure, thereby equalizing air pressure within and without the acoustic enclosure.

29. The electronic device of claim 28, wherein:
    the group of holes are laser-drilled; and
    each of the group of holes have an area less than 0.1 mm2.

30. The electronic device of claim 28, wherein:
    the acoustic enclosure comprises
        a body defining an opening; and
        a structure extending across the opening; and
    the group of holes are formed in the structure.

31. The electronic device of claim 30, wherein the group of holes are microperforated in the structure.

32. The electronic device of claim 31, wherein the group of microperforated holes are formed by a laser.

33. The electronic device of claim 30, wherein the group of holes are the sole openings of the acoustic enclosure.

34. An acoustic assembly for an electronic device, comprising:
an acoustically closed-box enclosure defining:
a first set of holes formed directly through a first wall of the enclosure, the holes extending through the entire wall; and
a second set of holes formed directly through at least a second wall of the enclosure; and
an acoustic component within, and mounted to, the enclosure such that the acoustic component divides an interior of the housing into a first region and a second region, the first wall bounding the first region and the second wall bounding the second region.

35. The acoustic assembly of claim 34, wherein the second set of holes permits sound to exit the second region.

36. The acoustic assembly of claim 34, wherein the first set of holes equalizes a pressure between the first region and an exterior of the acoustic assembly.

37. The acoustic assembly of claim 36, wherein the first set of holes are formed in a line.

38. The acoustic assembly of claim 36, wherein the first set of holes are formed in an array.

39. The acoustic assembly of claim 36, wherein the acoustic assembly is configured to operate as a closed-box speaker.

40. The acoustic assembly of claim 34, wherein:
the acoustic component is a first acoustic component; and
the acoustic assembly further comprises a second acoustic component mounted outside and to the enclosure.

* * * * *